United States Patent Office 3,372,739
Patented Mar. 12, 1968

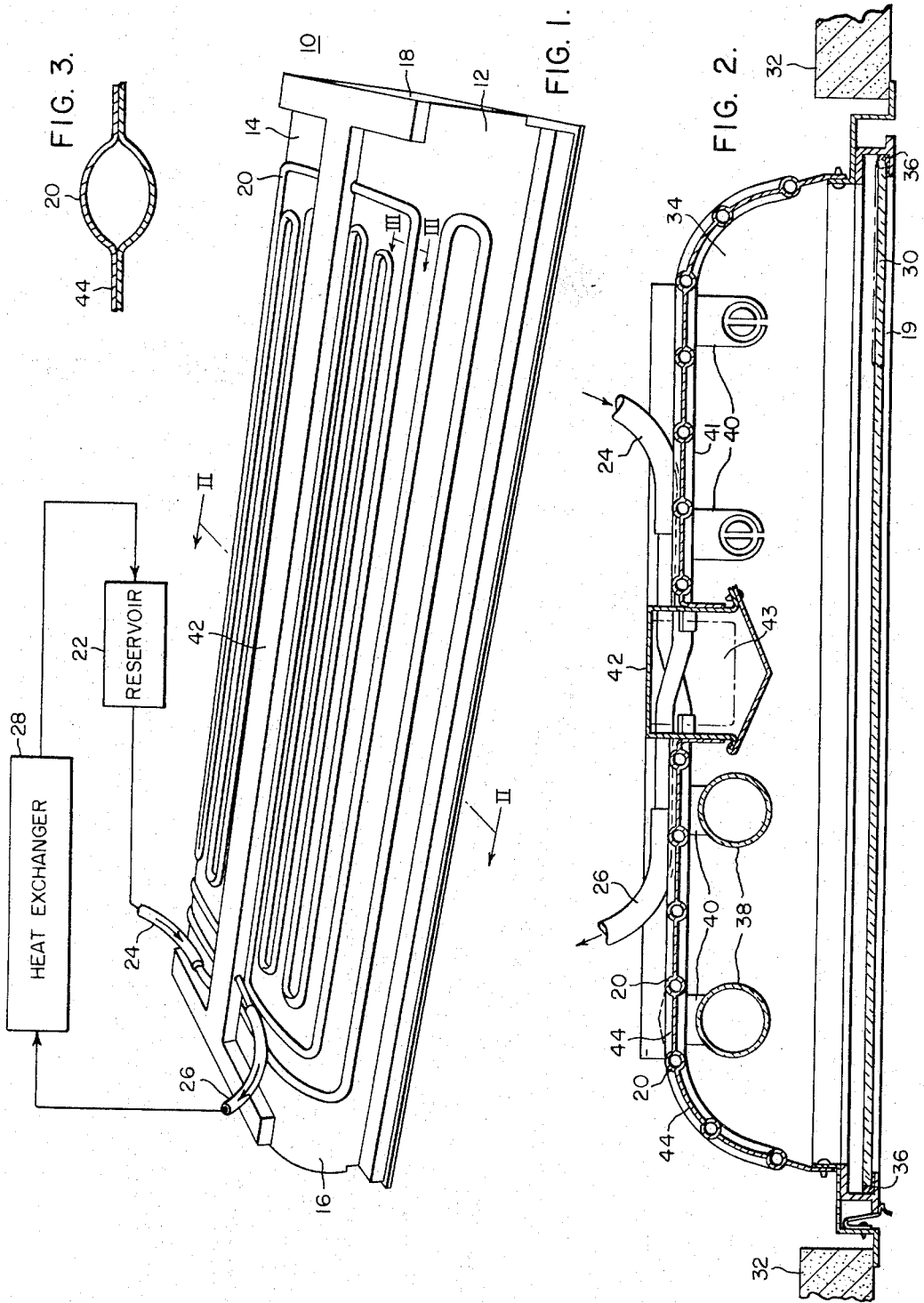

3,372,739
LIQUID-COOLED LUMINAIRE
John C. Kastovich, Franklin Township, Delmont, and Jack D. Meess, Franklin Township, Export, Pa., assignors to Westinghouse Electric Corporation, Pittsburgh, Pa., a corporation of Pennsylvania
Filed Jan. 12, 1966, Ser. No. 520,110
10 Claims. (Cl. 165—47)

ABSTRACT OF THE DISCLOSURE

A liquid-cooled luminaire having a troffer body including a top member and downwardly extending side walls which are formed by a plurality of parallel conduits joined at their ends to form a continuous flow path and separated by intervening web portions. The continuous flow path including at one end a liquid inlet and at the other end a liquid outlet which may be connected to a closed heat exchanger and liquid reservoir system. The cooling liquid is maintained in a state of turbulent flow through the parallel conduits and the troffer body is dimensioned in a manner such that the maximum temperature differential between the hottest area of the web portion and the conduits is from about 2° to 4° F.

This invention relates generally to luminaires and, more particularly, to liquid-cooled luminaires.

It is known to cool operating fluorescent lamp luminaires by passing cooling water through tubes or conduits disposed in heat transfer relationship with the luminaire. In this manner, a portion of the heat which is generated by the luminaire is prevented from entering the space which is illuminated. This in turn minimizes the amount of air-conditioning cooling air which is needed to cool the space being illuminated. In a brightly lighted space, the amount of heat which is introduced by the light-sources can be as much as fifty percent or more of the total heat which must be removed by conditioned air. Accordingly, if a large portion of the heat can be removed before it enters into the illuminated space, the savings in air-conditioning costs can be substantial, since the heated water is readily cooled with a simple and inexpensive spray-cooling apparatus, thereby substantially decreasing the initial costs, operating costs and space requirements of air conditioning equipment.

Water-cooled luminaires have usually utilized a copper troffer body in order to remove as much of the generated heat as possible, since copper is an excellent heat-conducting material. Copper is a relatively expensive and relatively weak structural material. In addition, even with a copper troffer body, water-cooled luminaires have not been as effective as desired with respect to removing generated heat so that it will not pass into the space to be illuminated.

It is an object of this invention to provide a liquid-cooled luminaire which utilizes a steel troffer body and which is very effective in removing the heat which is generated by the lamps contained in the luminaire.

It is another object to provide a liquid-cooled luminaire which is relatively inexpensive to fabricate and which is structurally very strong, in addition to being very effective in removing heat which is generated by the lamps contained in the luminaire.

It is a further object to provide a liquid-cooled luminaire which is constructed to remove a large portion of the heat generated therein while still minimizing the number of liquid-containing conduits which are utilized.

Briefly, these and other objects which will become apparent as the description proceeds, are achieved by providing a steel luminaire having tubes or conduits disposed on the reflector or troffer body of the luminaire in heat conducting relation. Even though steel is a relatively poor conductor of heat, the conduits which contain the cooling liquid are so spaced and dimensioned, with respect to the general luminaire design, that a substantial portion of the heat generated within the luminaire is removed, and this is achieved without using an excessive number of conduits which would increase production costs for the luminaire.

For a better understanding of the invention reference should be made to the accompanying drawings, in which:

FIGURE 1 is a perspective view of the present luminaire with the associated cooling apparatus shown in block form;

FIG. 2 is a sectional view of the luminaire taken along line II—II in FIG. 1;

FIG. 3 is an enlarged sectional view of a portion of the luminaire taken along line III—III of FIG. 1, showing one of the conduits;

Figure 4:
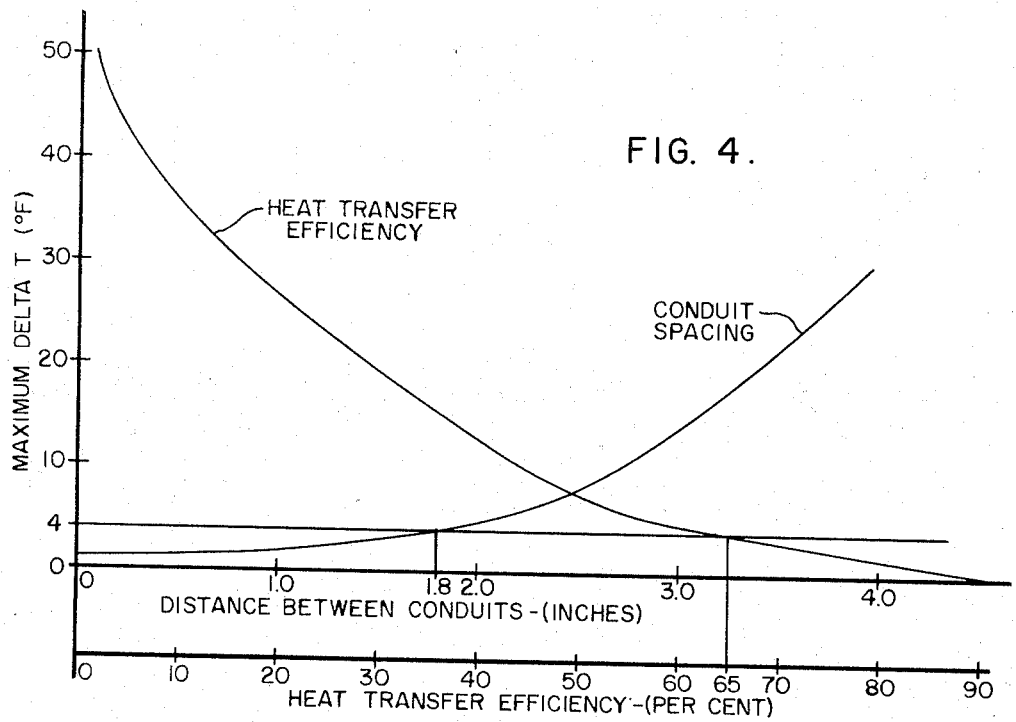
Figure 5:
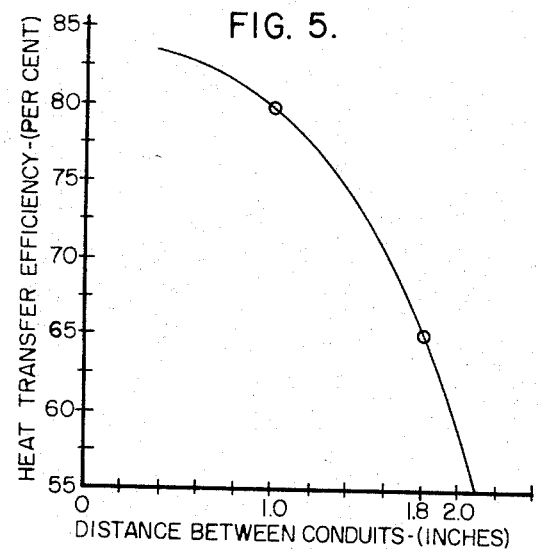
Figure 6:
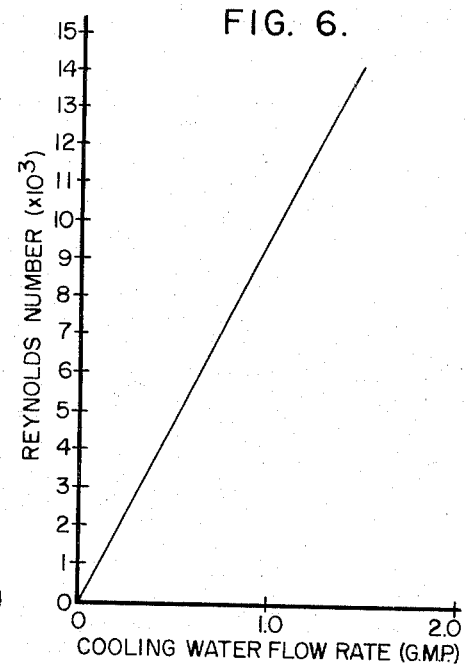

FIG. 4 sets forth curves of conduit spacing and heat removal efficiency both plotted against delta T, the maximum temperature difference across the web portions of the troffer;

FIG. 5 sets forth a curve (constructed from FIG. 4) of heat removal efficiency versus conduit spacing; and FIG. 6 is a plot of the Reynolds number of the cooling liquid against flow rate of the cooling liquid for a given effective conduit diameter.

Referring now to FIG. 1, a steel luminaire 10 is shown having a main troffer body 12 comprising a top member 14 and side walls 16. Small end walls 18 connect the side walls 16 and conduits 20 are provided in the troffer body 12. The side walls 16 and end walls 18 define a bottom light opening 19 (shown in FIG. 2). The conduits 20 are preferably unitarily formed as a part of the troffer 12 to enhance the heat conductance therebetween. Cooling liquid such as water or ethylene glycol, for example, from a reservoir 22 is pumped into the conduits through the inlet 24. The cooling liquid may contain small amounts of conventional anti-freeze and anti-rust agents. Preferably, the cooling liquid is maintained at such temperature as is readily available with a spray-cooling apparatus. However, substantial deviations from this cooling liquid temperature are permissible. The cooling liquid passes through the conduits 20 disposed across the troffer 12 and exits from the luminaire through the outlet 26. The cooling liquid then passes through a heat exchanger 28 (preferably a conventional spray cooler) and returns to the reservoir 22. The reservoir 22 and heat exchanger 28 are shown in block form in FIG. 1. A plurality of luminaires 10 may be supplied with cooling liquid from a single reservoir 22. The reservoir 22 and heat exchanger 28 are more detail in copending application titled "Lighting Luminaire Which is Liquid Cooled" Ser. No. 520,121, filed concurrently herewith, by the present inventors, and assigned to the present assignee.

FIG. 2 shows a solid light-transmitting closure member or light diffuser 30 covering the light opening 19 to form an enclosure 34 with the troffer body 12. The diffuser 30 may be infrared reflecting or absorbing to minimize the heat transfer through the diffuser. The luminaire 10 may be recessed into ceiling 32, as shown, with the diffuser 30 substantially flush with the lower surface thereof. If desired, a seal 36 may be included around the bottom opening 19 to engage the periphery of the diffuser 30. The seal 36 prevents dust from entering the enclosure 34, and prevents warm air within enclosure 34 from exiting therefrom through the bottom opening 19. Alternately, the luminaire 10 may be of the air-handling type in which air from the room passes through enclosure 34. In this alternate embodiment, the seal 36 would normally not be used. The enclosure 34 contains discharge means or light sources 38, such as fluorescent lamps for example, supported by lampholders 40. The lightt sources 38 have a predettermined input power rating, and generate heat within the enclosure 34. A reflector for the light sources 38 may be provided by a reflective coating over the inner surface 41 of troffer 12. Preferably, circuit and ballast components 43 are provided in housing 42 which is longitudinally disposed along the center of the luminaire 10 in heat exchange relationship with the troffer body 12. Preferably, both the ballast housing 42 and the enclosure 34 are cooled by the cooling liquid in conduits 20 to remove a substantial part of the heat of the heat generated by the ballast components 43 and light sources 38 respectively. Web portions 44 are provided between the adjacent conduit 20 in supporting and thermally conducting relationship thereto. The webs 44 and conduits 20 comprise substantially all of the troffer 12. The inner surface 41 of both the webs 44 and conduits 20 occupies a predetermined area and is oriented towards the light sources 38 to absorb the heat generated thereby. This heat is in turn conducted through the web 44 to the conduits 20, and carried away by the cooling liquid to the heat exchanger 28. In the example shown in FIG. 2, the conduits 20 are spaced substantially equal distances apart in order to minimize "delta T," which is the temperature difference between the hottest portion of a web 44 and the adjacent conduit means 20.

As can be seen in FIG. 3 the conduits 20 are conveniently formed by two oppositely contoured sides which are held together along the inner surfaces of webs 44. The conduits 20 need not be circular and therefore are described as having an equivalent diameter. The equivalent diameter of a non-circular configuration is defined as:

$$4 \times \frac{\text{(cross-sectional area)}}{\text{wetted perimeter}}$$

Referring to FIG. 4, the curve labeled "heat transfer efficiency" is a curve of maximum temperature difference between the webs 44 and the conduits 20 versus heat transfer efficiency in percent.

Heat transfer efficiency represents the amount of heat which is removed by the circulating cooling liquid divided by the total amount of power which is supplied to the luminaire. In order to obtain a heat transfer efficiency of greater than 65% it is necessary to maintain delta T at less than about 4° F.

The curve in FIG. 4 labeled "conduit spacing" is a plot of delta T versus the center to center spacing in inches between adjacent conduits 20. To achieve a delta T of less than about 4° F., the conduit spacing must be less than about 1.8 inches (at 1.8 inches the efficiency is about 65%). As the spacing is decreased, delta T decreases and the efficiency increases. Eventually, a point is reached where decreasing the spacing has very little effect on delta T. As shown in FIG. 5, the curve of heat transfer efficiency versus conduit spacing begins to level off when the conduit spacing is decreased to about one inch. While limited increases in efficiency can be obtained with an even closer conduit spacing than one inch, the benefits to be gained are more than offset by the increased fabricating costs associated with providing very closely spaced conduits. The optimum range of conduit spacing is from about 1.2 to about 1.6 inches, with a spacing of 1.4 inches being preferred.

For effective heat transfer considerations the cooling liquid should be in a state of turbulent flow to cause the cooling liquid temperature to remain substantially constant over the cross section of the conduits 20. In contrast, in laminar flow, the outer temperature of the cooling liquid is greater than the center stream. The cooling liquid will exhibit turbulent flow when it flows with a Reynolds number of from about 2000 to 10,000. A Reynolds number range of 3000–5000 is preferred. As is well known, Reynolds number is the product of the flow velocity, times the conduit equivalent diameter, times the fluid density, divided by the fluid coefficient of viscosity. Referring to FIG. 6, the Reynolds number of the cooling liquid flow is plotted against the cooling liquid flow rate for the preferred equivalent diameter of 0.364 inch for conduits 20. The equivalent diameter of conduits 20 may vary over the range of from about 0.2 to about 0.5 inch and is selected so as to cooperate with the predetermined length of the conduit 20 and pressure head thereacross to result in a turbulent flow at a relatively low flow rate. The low flow rate is predetermined to ensure a good heat transfer with low pressure head across the inlet 24 and outlet 26. It is desirable to maintain a low pressure head to reduce the required pumping power.

The thickness of troffer 12 is limited to from about 0.020 to about 0.040 inch (0.030 inch being preferred) because of heat transfer, structural and economic considerations. The dimension must be thick enough to have a low impedance to heat flow thus keeping delta T to a minimum. However, if the thickness is too great, the weight and cost of the troffer 12 increases.

As a specific example of the present invention, the predetermined troffer surface area 41 is about 8 square feet the predetermined power rating of the fluorescent light sources 38 is about 160 watts, the predetermined pressure head maintained between inlet 24 and outlet 26 is about 1.4 p.s.i., the predetermined length of the conduit 20 is 56 feet, the predetermined flow rate of the cooling liquid is 0.5 g.p.m., and the predetermined equivalent diameter of conduit 20 is 0.364 inch. These factors cooperate to produce a delta T of about 3° F. and a Reynolds number of about 4500. With such a luminaire, cooling water can be spray cooled to a temperature of about 77° F. and used to cool the luminaire, during which cooling the water temperature will rise approximately 1.8° F.

While a preferred specific luminaire has been described in detail, it should be understood that the luminaire design as described can be varied considerably, provided that: (1) the conduit portions of the steel troffer body are spaced from each other by a center-to-center distance of from about 1 inch to about 1.8 inches; (2) the pressure head across the conduit ends and effective diameter of the conduit along with the conduit length are all so related that cooling fluid flows through the conduit with a Reynolds number of from about 2,000 to 10,000; and (3) the power input to the lamps contained within the luminaire is so related to the inner surface area of the cooled troffer body that the maximum temperature differential between the conduit and the hottest portions of the webs separating adjacent conduit portions is from about 2° F. to about 4° F.

As a possible alternative embodiment, the present luminaire can be operated on the winter cycle in conjunction with a heat-exchange device which removes the heat from the liquid used to cool the luminaire. This removed heat is then pumped to areas which require additional heating. As an example, during the winter cycle the heat removed by the heat exchanger can be pumped into the individual rooms at a location beneath the windows, thereby facilitating all-electric heating of buildings.

As another possible alternative embodiment, the conduit means which comprise the troffer body can be formed as a plurality of conduit members all connecting in parallel to common manifolds. With such a construction, the pressure head maintained between the inlet and outlet manifolds would be decreased accordingly to maintain a liquid flow through the conduits which were similar to that described in the foregoing specific example.

It will be apparent to those skilled in the art that the objects of this invention have been achieved by providing a liquid-cooled steel luminaire which is structurally strong, inexpensive to fabricate, and which is very effective in removing heat generated therein.

Although this invention has been described with respect to particular embodiments thereof, it is not to be so limited as changes and modifications may be made therein which are within the intended scope of the invention.

We claim as our invention:

1. A liquid-cooled fluorescent luminaire comprising:
   a steel troffer body having a top member and downwardly extending side walls, said troffer body having a predetermined inner surface area;
   end walls positioned at each end of said troffer body, said side walls and said end walls defining a bottom light opening;
   a solid light-transmitting closure member supported by said luminaire and substantially covering said bottom light opening to form an enclosure with said troffer body and said end walls;
   said enclosure adapted to contain fluorescent discharge means having a predetermined input power rating;
   conduit means unitarily formed as a part of said top member and downwardly extending side walls, and adjacent portions of said conduit means spaced from each other by a center-to-center distance of from about 1 inch to about 1.8 inches;
   web members unitarily formed as a part of said top member and downwardly extending side walls and connecting the adjacent portions of said conduit means, said web members and said conduit means being in heat transfer relationship and forming substantially all of said top member and downwardly extending side walls;
   liquid inlet means connected to said conduit means and adapted to be connected to a reservoir of cooling liquid for supplying cooling liquid which removes a substantial part of the heat generated within said enclosure by the discharge means;
   liquid outlet means connected to said conduit means and adapted to be connected to heat exchange means operative to cool the cooling liquid leaving said conduit means through said outlet means, said inlet means and said outlet means adapted to have a predetermined pressure head of liquid maintained therebetween when said luminaire is cooled by cooling liquid flowing through said conduit means;
   said conduit means having a predetermined length and equivalent diameter and configuration which cooperates with the predetermined pressure head adapted to be maintained across said inlet means and said outlet means to establish a predetermined rate of flow of the cooling liquid through said conduit means, which cooling liquid flows with a Reynolds number of from about 2000 to about 10,000 thereby causing said flow to be turbulent; and
   the spacing between adjacent portions of said conduit means, the inner surface area of said troffer body and the rated power input for the discharge means cooperating to establish a temperature differential between the hottest portion of said web members and said conduit means of from about 2° F. to 4° F. when said discharge means is operating and cooling liquid is flowing at its predetermined rate of turbulent flow through said conduit means.

2. The luminaire as specified in claim 1, wherein adjacent portions of said conduit means are spaced by a center to center distance of from about 1.2 inches to about 1.6 inches.

3. The luminaire as specified in claim 1, wherein adjacent portions of said conduit means are spaced by a center to center distance of about 1.4 inches.

4. The luminaire as specified in claim 1, wherein said cooling liquid flows through said conduit means with a Reynolds number of from about 3,000 to about 5,000.

5. The luminaire as specified in claim 1, wherein the predetermined equivalent diameter of said conduit means is from about 0.2 inch to about 0.5 inch.

6. The luminaire as specified in claim 1, wherein the predetermined equivalent diameter of said conduit means is 0.364 inch.

7. The luminaire as specified in claim 1, wherein a ballast housing containing ballast components is positioned on said troffer body in seat exchange relationship with said conduit means to remove the heat generated therein by said ballast components when the discharge means is operating and the cooling liquid is flowing through said conduit means.

8. The luminaire as specified in claim 1, wherein the thickness of said troffer body is from about 0.020 inch to about 0.040 inch.

9. The luminaire as specified in claim 1, wherein the thickness of said body troffer is about 0.30 inch.

10. A water-cooled fluorescent luminaire comprising:
    a steel troffer body having a top member and downwardly extending side walls, and said troffer body having a predetermined inner surface area;
    end walls positioned at each end of said troffer body, said side walls and said end walls defining a bottom light opening;
    a solid light-transmitting closure member supported by said luminaire and substantially covering said bottom light opening to form an enclosure with said troffer body and said end walls;
    fluorescent discharge means having a predetermined input power rating and supported by said housing within said enclosure;
    conduit means unitarily formed as a part of said top member and downwardly extending side walls, and adjacent portions of said conduit means spaced from each other by a center to center distance of from about 1 inch to about 1.8 inches;
    web members unitarily formed as a part of said top member and downwardly extending side walls and connecting said conduit means, said web members and said conduit means being in heat transfer relationship and forming substantially all of said top member and downwardly extending side walls;
    water inlet means connected to said conduit means;
    a reservoir of cooling water connected to said conduit means for supplying cooling water which removes substantially all of the heat generated within said enclosure by said discharge means;
    water outlet means connected to said conduit means;
    heat exchange means connected to said outlet means and operative to cool the cooling water leaving said conduit means through said outlet means, said inlet means and said outlet means having a predetermined pressure head of liquid maintained therebetween when said luminaire is cooled by cooling water flowing through said conduit means;
    said conduit means having a predetermined length and equivalent diameter and configuration which cooperates with the predetermined pressure head maintained across said inlet means and said outlet means to establish a predetermined rate of flow of the cooling water through said conduit means with a Reynolds number of from about 2,000 to about 10,000 thereby causing said flow to be trubulent; and
    the spacing between adjacent portions of said conduit means and the inner surface area of said troffer body and the rated power input for said discharge means cooperating to establish a temperature difference between the hottest portion of said web members and said conduit means of from about 2° F. to 4° F. when said discharge means is operating and cooling water is flowing at its predetermined rate of turbulent flow through said conduit means.

References Cited

UNITED STATES PATENTS 3,193,001   7/1965   Meckler   98—400

ROBERT A. O'LEARY, Primary Examiner.

CHARLES SUKALO, Examiner.